(12) United States Patent
Kitamura et al.

(10) Patent No.: US 7,431,511 B2
(45) Date of Patent: Oct. 7, 2008

(54) ROLLING BEARING

(75) Inventors: Kazuhisa Kitamura, Nara (JP); Tomoya Hattori, Osaka (JP); Kazunori Hayashida, Osaka (JP); Kenichi Kouduki, Osaka (JP); Kazuyoshi Yamakawa, Hyogo (JP)

(73) Assignee: Koyo Seiko Co., Ltd., Osaka-shi (JP)

( * ) Notice: Subject to any disclaimer, the term of this patent is extended or adjusted under 35 U.S.C. 154(b) by 171 days.

(21) Appl. No.: 10/778,921

(22) Filed: Feb. 17, 2004

(65) Prior Publication Data

US 2004/0208409 A1 Oct. 21, 2004

(30) Foreign Application Priority Data

Feb. 18, 2003 (JP) ............... P.2003-039197
Oct. 30, 2003 (JP) ............... P.2003-370079

(51) Int. Cl.
*F16C 33/76* (2006.01)
(52) U.S. Cl. ............... 384/484; 384/492; 384/607
(58) Field of Classification Search ......... 384/477–488, 384/607, 907.1, 492, 490
See application file for complete search history.

(56) References Cited

U.S. PATENT DOCUMENTS

| 2,275,325 | A | * | 3/1942 | Searles ............... 277/411 |
| 2,621,091 | A | * | 12/1952 | Hickling ............... 384/484 |
| 2,712,460 | A | * | 7/1955 | Saywell ............... 277/376 |
| 3,272,574 | A | * | 9/1966 | Tassone et al. ............... 384/482 |
| 3,527,512 | A | * | 9/1970 | Miller ............... 384/482 |
| 3,768,880 | A | * | 10/1973 | Howe ............... 384/480 |
| 3,957,278 | A | * | 5/1976 | Rabe ............... 277/549 |
| 4,391,476 | A | | 7/1983 | Negele et al. |
| 4,934,837 | A | * | 6/1990 | Kawamura ............... 384/463 |
| 5,024,449 | A | * | 6/1991 | Otto ............... 277/353 |
| 5,121,999 | A | * | 6/1992 | Johnson et al. ............... 384/477 |
| 5,470,158 | A | * | 11/1995 | McLarty et al. ............... 384/484 |
| 5,741,762 | A | * | 4/1998 | Kahlman ............... 508/108 |
| 5,863,135 | A | * | 1/1999 | Bildtsen et al. ............... 384/477 |
| 6,062,734 | A | * | 5/2000 | Bundgart ............... 384/477 |
| 2003/0026509 | A1 | | 2/2003 | Yakura et al. |

FOREIGN PATENT DOCUMENTS

| EP | 1 070 864 A1 | 1/2001 |
| EP | 1 239 173 A2 | 9/2002 |
| JP | 61-82017 | 8/1986 |
| JP | 6-17688 | 3/1994 |
| JP | 6-337016 | 12/1994 |
| JP | 7-103247 | 4/1995 |
| JP | 11-247864 | 9/1999 |
| JP | 2002-147475 | 5/2002 |

* cited by examiner

*Primary Examiner*—Richard W L Ridley
*Assistant Examiner*—Justin Krause
(74) *Attorney, Agent, or Firm*—McGinn IP Law Group, PLLC

(57) ABSTRACT

A rolling bearing includes: outer and inner rings, at lease one of which is made of a ceramics; a plurality of rolling elements interposed between the outer and inner rings; a seal groove, a sectional shape in an axial direction of which is formed by substantially a partial circular arc, and which is formed on a shoulder portion of a raceway of one of the outer and inner rings; and a resin seal member including a peripheral edge portion fitted to the seal groove.

17 Claims, 6 Drawing Sheets

ROLLING BEARING

BACKGROUND OF THE INVENTION

The present invention relates to a rolling bearing having a bearing ring made of a ceramics.

In mounting a seal member to a (rolling) bearing ring made of a ceramics, for example, the seal member is fitted to an even shoulder portion of a peripheral face of the bearing ring on a side of a raceway, or fitted to a seal groove formed at the shoulder portion (refer to, for example, JP-A-11-247864). The seal groove in this case is constituted by a shape the same as that of a seal groove provided at a general bearing ring made of a metal, that is, an inside corner shape in which a diameter thereof is gradually increased from an end edge in an axial direction to the side of the raceway, a groove depth is deep and which is provided with a comparatively acute angle.

In the above-described example of the related art, the groove shape of the seal groove of the bearing ring made of a ceramics is constituted by the shape the same as the shape of the seal groove of the general bearing ring made of a metal and therefore, the shape amounts to an increase in cost such that time is taken in cutting or the like.

On the other hand, a ceramics is used for a member of a bearing used under a special environment of under a corrosive gas atmosphere or the like in consideration of durability (corrosion resistance) of a bearing material against the environment. A ceramic rolling bearing constituting inner and outer rings by a ceramics is frequently used by a constitution of an open type (without seal) since workability thereof is poorer than a general rolling bearing using bearing steel and it is difficult to form (process) a deep groove for mounting a seal (refer to, for example, JP-B-6-17688).

In a related art, in order to achieve long service life of such a ceramic rolling bearing, as means for hermetically sealing an opening thereof, there has been proposed a method of ensuring sealing performance by respectively mounting members substituting for seals on outer sides of both end portions of a fixed ring and covering openings of a ring-like space by the members (refer to, for example, JP-A-6-337016).

Meanwhile, when a sealing plate (shield) made of a metal is used for a rolling bearing in which inner and outer rings thereof are made of a ceramics, strict dimensional accuracy is required for the sealing plate and sealing plate mounting grooves (mounting faces) of the inner and outer rings made of a ceramics which are difficult to work and therefore, there poses a problem that working cost is increased. Further, in an environment requiring corrosion resistance, there is a case in which the metal-made sealing plate per se is corroded and cannot be used.

Further, when the seal mounting grooves are provided at end faces of the inner and outer rings made of a ceramics which is a brittle material, there is produced an inside corner (inside angular portion) accompanied by an abrupt change in an angle at a portion of the groove shape and there also is a concern of initiating a crack or the like by constituting an onset by the inside corner.

SUMMARY OF THE INVENTION

The invention has been carried out in order to deal with the above-described problems. An object thereof is to provide a rolling bearing in which the one ring can simply be formed by grinding by the grinding stone or the like without depending on cutting and fabrication cost of the rolling bearing is be reduced. Another object is to provide a hermetically sealing type ceramic rolling bearing capable of preventing working cost caused by working a seal mounting groove from being increased and a crack or the like from being brought about and capable of maintaining excellent lubrication over a long period of time even under a corrosive environment.

In order to solve the aforesaid object, the invention is characterized by having the following arrangement.

A rolling bearing including outer and inner rings, at least one of which is made of a ceramics, a plurality of rolling elements interposed between the outer and inner rings, a seal groove, a sectional shape in an axial direction of which is formed by substantially a partial circular arc, and which is formed on a shoulder portion of a raceway of one of the outer and inner rings, and a resin seal member including a peripheral edge portion fitted to the seal groove.

The rolling bearing wherein outer and inner rings are made of the ceramics.

The rolling bearing wherein the rolling element includes a ball, the raceways of the inner and outer rings are formed in groove shape, and a maximum depth of the seal groove is set to be smaller than a maximum depth of the raceway.

The rolling bearing wherein a width of the seal groove in the axial direction is set to be equal to or smaller than ¼ of a total length dimension in the axial direction of the one of the inner and outer rings, and a radius of curvature of the seal groove is set to be a value obtained by multiplying a depth of the seal groove by a multiplication factor of 5 to 30.

The rolling bearing wherein a maximum depth of the seal groove is set equal to or smaller than 0.2 mm.

The rolling bearing wherein a maximum depth of the seal groove is set equal to or smaller than 0.1 mm.

The rolling bearing wherein the seal member includes a fitting portion fitted to the seal groove and a barrel portion opposed to the shoulder portion of the raceway of the other ring with a small clearance, a width of the fitting portion in the axial direction is set equal to or larger than 1.2 times of a width of the barrel portion in the axial direction.

The rolling bearing further including a crown type cage which includes a pocket portions for holding the plurality of rolling elements at predetermined intervals, respectively, and a columnar portion connecting the pocket portions, wherein annular openings are defined between the inner and outer rings at opposite sides thereof, wherein the columnar portion includes a projected portion projected in a diameter direction perpendicular to the axial direction to seal one of the openings, and wherein the other openings is sealed by the seal member.

DETAILED DESCRIPTION OF PREFERRED EMBODIMENTS

An explanation will be given of embodiments of the invention with reference to the drawings as follows.

First Embodiment

Figure 1:
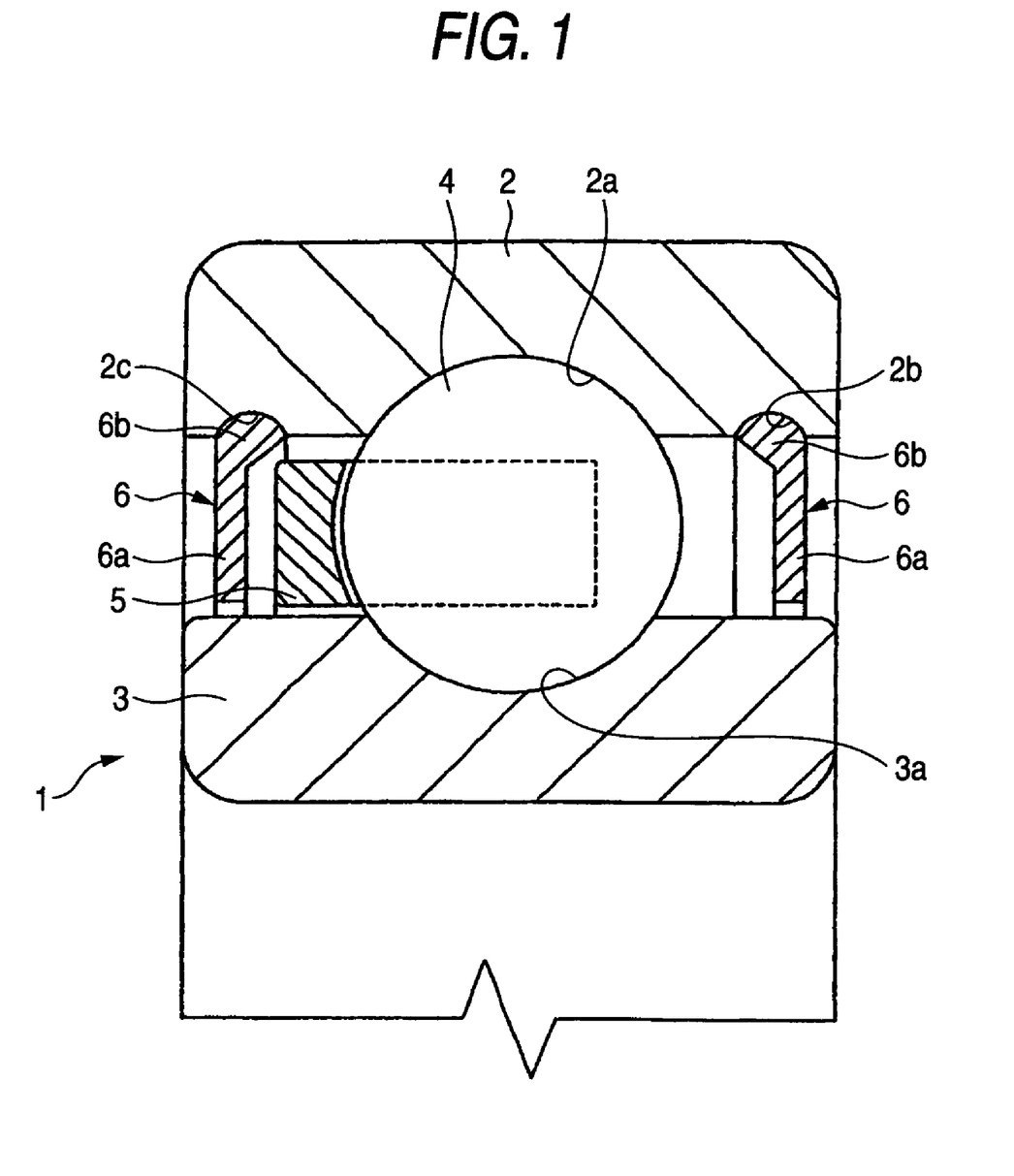
FIG. 1 is a view showing a section of an upper half of a rolling bearing according to a first embodiment of the invention.
Figure 2:
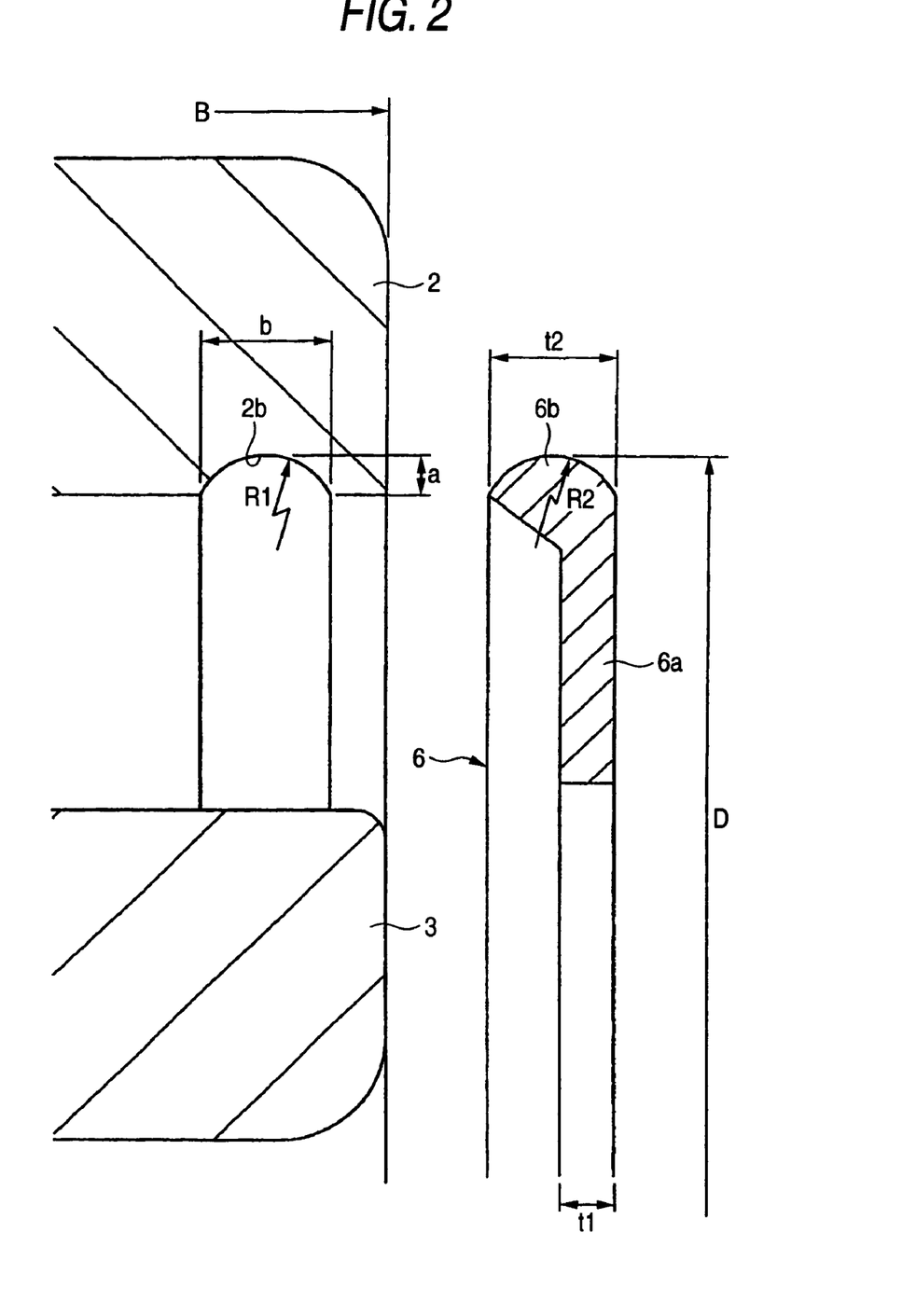
FIG. 2 is a view showing to enlarge an essential portion of FIG. 1.

FIG. 1 is a view showing a section of an upper half of a bearing and FIG. 2 is a view showing to enlarge an essential portion of FIG. 1.

A rolling bearing 1 of the illustrated example is of a type of a deep groove ball bearing and is provided with an outer ring 2, an inner ring 3, a plurality of rolling elements (balls) 4 and a cage 5. Ring-shape seal (sealing) members 6 are integrated to opposite ends in an axial direction between the outer ring 2 and the inner ring 3. An inner space of the bearing is hermetically sealed by the two seal members 6 and a lubricant of grease, oil or the like is sealed at the inner space of the bearing.

The outer ring 2 is provided with a raceway 2a in a groove shape at a middle in an axial direction of an inner peripheral face thereof and two shoulder portions in the axial direction of the raceway 2a are provided with seal grooves 2b, 2c. The inner groove 3 is provided with a raceway 3a in a groove-like shape at a middle in the axial direction of an outer peripheral face thereof and two shoulder portions in the axial direction of the raceway 3a are formed to be even. The rolling elements 4 are arranged between the raceways 2a, 3a and are held substantially at equal intervals in a circular peripheral direction by the cage 5. The cage 5 may be of a crown type or other type.

Outer peripheral edge portions of the seal members 6 are fitted to the seal grooves 2b, 2c of the outer ring 2, respectively. Inner peripheral edge portions of the seal members 6, 6 are arranged to be opposed to shoulder portions of opposite ends in the axial direction at the outer peripheral face of the inner ring 3 with small clearances.

Both the outer ring 2 and the inner ring 3 of the invention may be made of ceramic. However, the outer ring 2 is preferred to be made of ceramic. The rolling element 4 is arbitrarily made of ceramic or made of bearing steel. Ceramics includes silicon nitride species ceramics, silicon carbide species ceramics, alumina ceramics, zirconia ceramics and the like. The seal member 6 is made of a resin of fluorine species resin, engineering plastics or the like. The rolling bearing 1 having such a constitution is suitable for being used in, for example, an environment in which a corrosive gas is present, and in an environment which needs a nonmagnetic material.

A detailed description will be given of shapes of the seal grooves 2b, 2c of the outer ring 2 and the seal member 6.

According to the seal grooves 2b, 2c of the outer ring 2, a sectional shape along a width direction is constituted by a partial circular arc. The size of the partial circular arc may be equal to or smaller than a half circular arc. Further, the shape may be constituted by a single circular arc, a shape integrated with a plurality of circular arcs having different diameters, or a curve approximated to a circular arc, that is, substantially a circular arc. In the case of the seal grooves 2b, 2c having such a shape, the seal grooves 2b, 2c can simply and swiftly be formed (processed) only by grinding by pressing, to the outer ring 2 made of a ceramics, the grinding stone having a same shape as that of the seal grooves 2b, 2c.

The seal member 6 is constituted by a barrel portion 6a preferably having a uniform width from an inner peripheral end edge thereof to a middle thereof on an outer diameter side and a fitting portion 6b in which a side thereof on an outer diameter side of the barrel portion 6a is provided with a width wider than the barrel portion 6a. The fitting portion 6b is projected only in an inner direction of the bearing, in other words, an inner side of the barrel portion 6a in a width direction is cut out along a diameter direction. With virtue of the projected shape of the fitting portion 6b, the seal member 6 and the cage 5 can be restrained from interfering with each other and an amount of sealing a lubricant to an inner space of the bearing can be increased as large as possible. The fitting portions 6b are made to fit to the seal grooves 2b, 2c by coinciding with inner faces of the grooves of the seal grooves 2b, 2c without clearances therebetween and a sectional shape thereof in the width direction is constituted by the above-described partial circular arc.

An explanation will be given of dimensions of respective portions of the seal grooves 2b, 2c and the seal member 6.

In the seal grooves 2b, 2c, a maximum depth a thereof is set to be smaller than a maximum depth of the raceway 2a and a dimension in the axial direction (width) b is set to be equal to or smaller than ¼ of a total length dimension B in the axial direction of the outer ring 2 and a radius of curvature R1 is set to be a value obtained by multiplying the depth a by a multiplication factor of 5 to 30.

In the seal member 6, a width dimension t2 of the fitting portion 6b is set to a value which is equal to or larger than 0.025 times of a diameter dimension D of the seal member 6 and equal to or larger than 1.2 times of a width direction t1 of the barrel portion 6a. A minimum thickness of the seal member 6 is set to be larger than the width dimension t1, further, a radius of curvature R2 is set to be equal to the radius of curvature R1 of the seal grooves 2b, 2c. In this case, it is preferable to set the width b in the axial direction of the seal grooves 2b, 2c in consideration of a width of the two shoulder portions of the raceway 2a.

As described above, the seal grooves 2b, 2c of the outer ring 2 made of a ceramics are constituted by a simple shape of the partial circular arc and a depth thereof is made to be shallower than the depth of the raceway 2a and therefore, the seal groove can simply and swiftly be formed (processed) by a grinding stone, which can contribute to a reduction in processing cost. Further, the seal members 6 are mounted to the seal grooves 2b, 2c, respectively, in a state of being more or less depressed in the diameter direction and therefore, the seal members 6 are made to be difficult to draw out from the seal grooves 2b, 2c and further, owing to a relationship between the seal grooves 2b, 2c and the fitting portions 6b of the seal members 6 by the partial circular arc, the shape can contribute to promote hermetically sealing performance such that the seal member 6 is stabilized by an attitude of being erected straightly in the diameter direction and the clearance between the seal member 6 and the inner ring 3 can accurately be controlled and so on.

Figure 3:
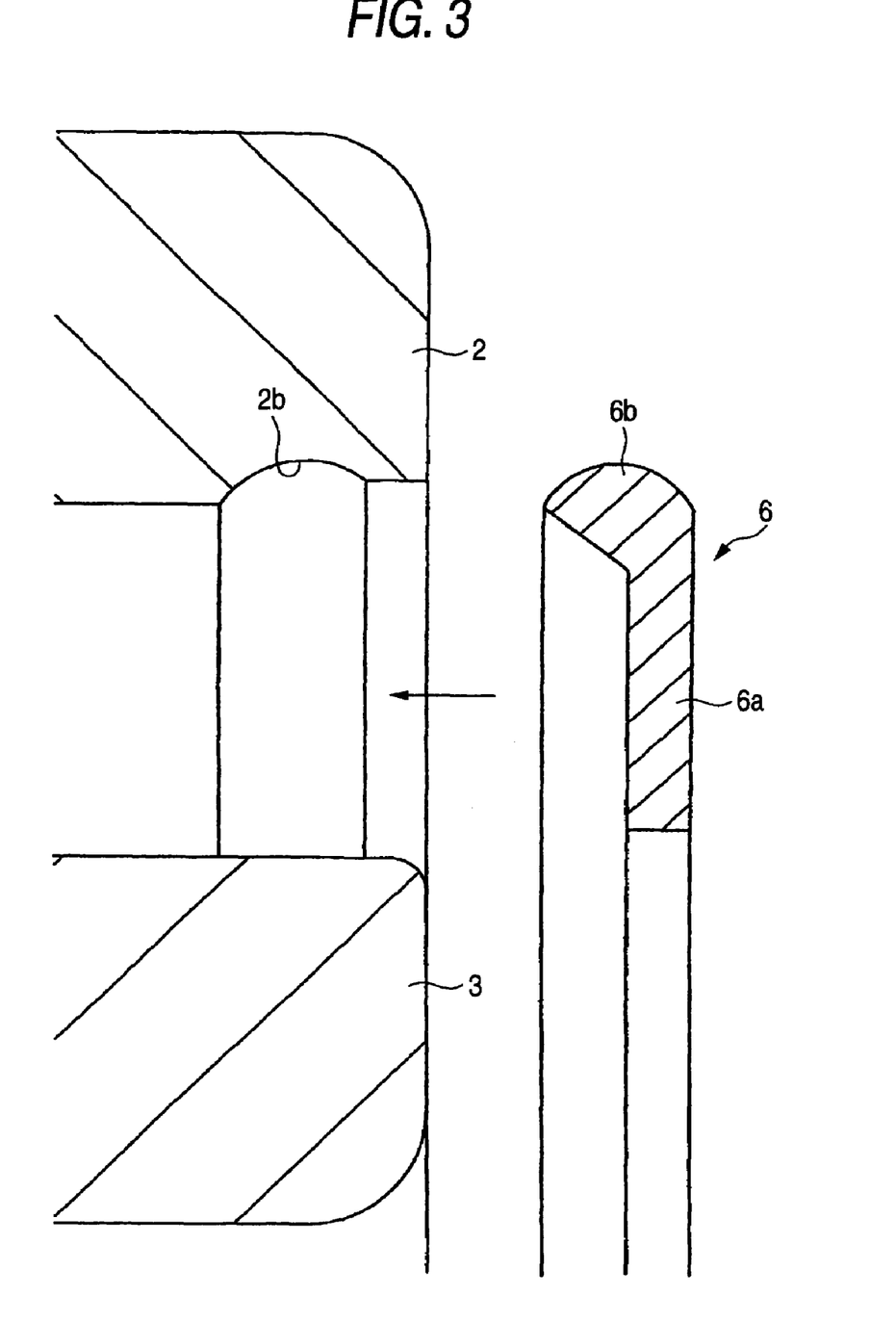
FIG. 3 is a sectional view showing a seal groove of an outer ring according to a modification of the first embodiment.

Further, as shown in FIG. 3, a diameter of the seal grooves can be made by enlarged in a state in which respective outer end sides of the seal grooves 2b, 2c (only the seal groove 2b on one side is illustrated) of the outer ring 2 are made to be smaller than a diameter dimension at positions of the maximum depth of the seal grooves 2b, 2c. In this case, the seal member 6 are made to be easy to attach to the seal grooves 2b, 2c.

Figure 4:
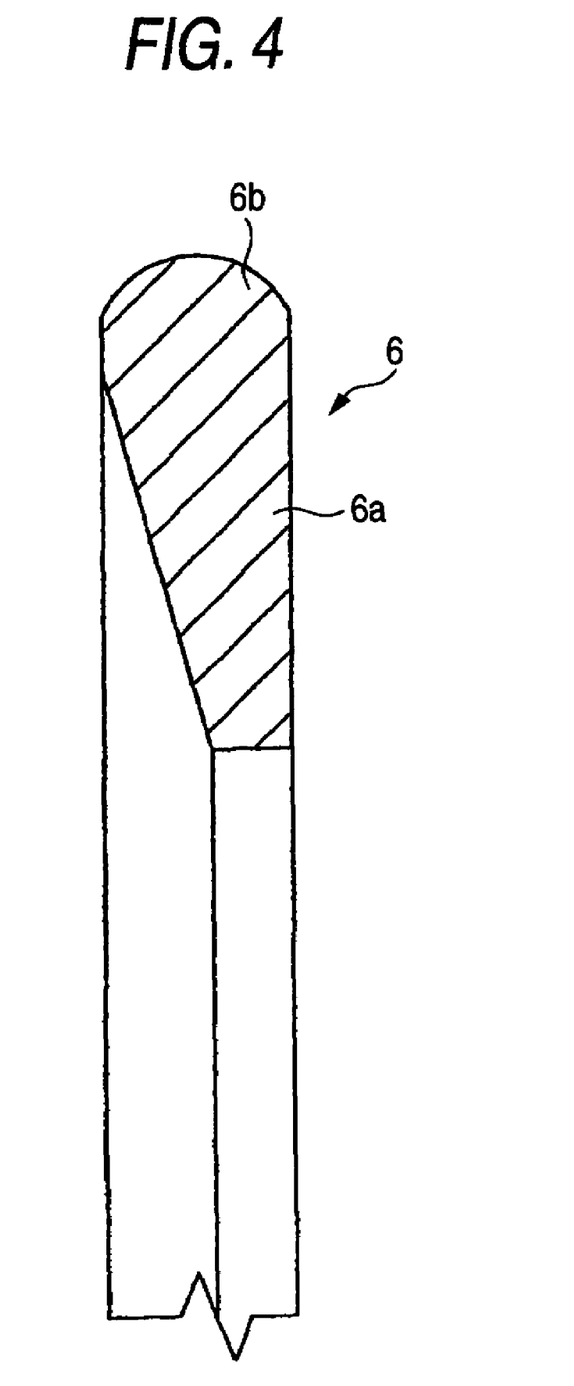
FIG. 4 is a view showing of a seal member according to another modification of the first embodiment.

Further, as shown in FIG. 4, the seal member 6 can be constituted by a shape in which widths of the barrel portions 6a are gradually narrowed from sides of the fitting portions 6b to inner peripheral edges thereof to constitute inner side faces thereof by taper-like inclined faces. In this case, rigidity of the seal member 6 per se can be more increased than that shown in FIG. 1, deformation of warp or the like is made to be difficult to be brought about and the hermetically sealing performance is promoted.

The rolling bearing of the invention is applicable also to a double row ball bearing, or a single row or double row roller bearing.

Second Embodiment

Figure 5:
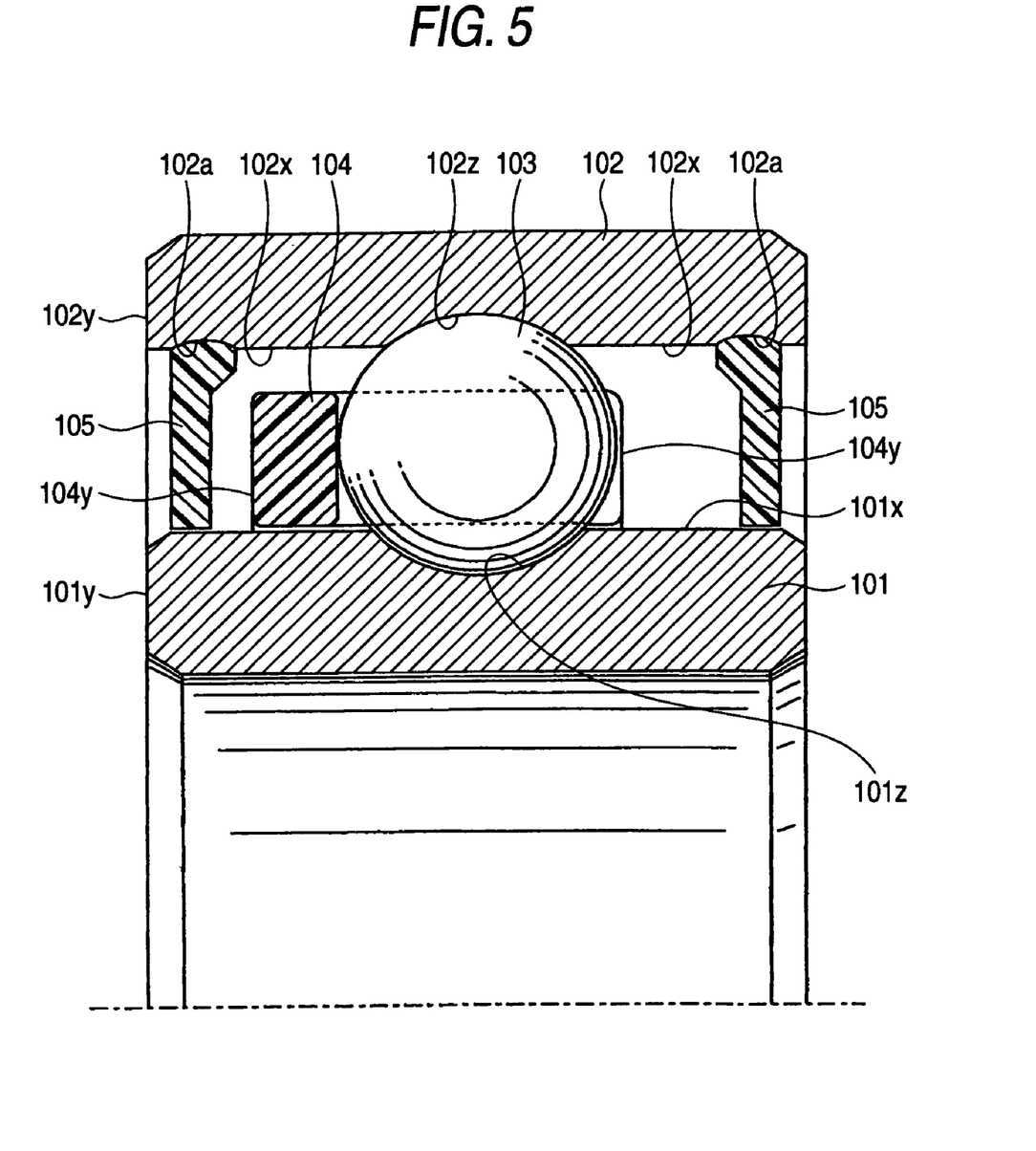
FIG. 5 is a sectional view showing a structure of a ceramic rolling bearing according to a second embodiment of the invention.

FIG. 5 is a sectional view showing a structure of a rolling bearing according to a second embodiment of the invention. A basic constitution of the rolling bearing according to the second embodiment is similar to that of a ball bearing having a deep groove of a related art and comprises an inner ring 101 and an outer ring 102 arranged concentrically, a plurality of balls 103, a cage 104 and seal members 105 in a circular ring shape.

An inner ring side track groove 101z is formed at the center in an axial direction of an outer peripheral face 101x of the inner ring and an outer ring side track groove 102z is formed at an inner peripheral face 102x of the outer ring opposed to the inner ring track groove 101z. Further, the balls 103 are arranged on a ball raceway formed by the inner ring side track groove 101z and the outer ring side track groove 102z and rollably held by pockets of the cage 104 at predetermined intervals in a peripheral direction. Further, grease or the like, not illustrated, is filled in a ring-like space arranged with the balls and the cage 104 and the seal members 105 for preventing grease from being leaked are respectively arranged at openings of opposite ends in the axial direction of the ring-like space.

The ball bearing is constituted as a so-to-speak all ceramic bearing formed by using a ceramics for the inner ring 101, the outer ring 102 and the ball 103. Further, according to the ball bearing, the cage 104 and the seal members 105 are formed by using a resin having corrosion resistance. The grease filled in the ring-like space is pertinently selected in accordance with an environment used. It is preferable to use a grease of silicone species for an environment particularly requiring waterproof and use a grease of fluorine species when a chemically stable grease is needed owing to a corrosive gas atmosphere or the like.

A characteristic of a structure of the rolling bearing resides in a method of mounting the resin-made seal member 105 for hermetically sealing the ring-like space and in a fact that circular peripheral grooves 102a, 102a having a circular arc shape in section for constituting seal mounting grooves are respectively formed at portions of the inner peripheral face 102x of the outer ring 102 disposed on outer sides in the axial direction of the cage 104 of the bearing and the seal members 105 are fitted to fix to the circular peripheral grooves 2a, 2a. Further, the circular peripheral grooves 102a are formed at even regions on outer sides of end faces 104y of the cage 104 and on inner sides of end faces 102y of the outer ring, respectively.

With the above-described constitution according to the rolling bearing, the seal member 105 can directly and easily be fitted to fix to the circular peripheral groove 102a and the grease filled at inside of the ring-like space can firmly be sealed. Therefore, the rolling bearing according to the embodiment can demonstrate long service life for maintaining excellent lubrication over a long period of time even under a corrosive environment.

Further, the circular peripheral groove 102a can easily be formed (processed) even in the bearing member made of a ceramics working of which is said to be difficult and further, by constituting a sectional shape thereof by substantially a circular arc shape without having an angular portion, an increase in processing cost and a crack or the like due to the circular peripheral groove 102a can be prevented.

Further, a maximum depth of the circular peripheral groove 102a is preferably equal to or smaller than 0.2 mm, further preferably, equal to or smaller than 0.1 mm when easiness of processing, an effect of preventing a crack or the like is taken into a consideration.

Third Embodiment

Next, an explanation will be given of a third embodiment of the invention.

Figure 6:
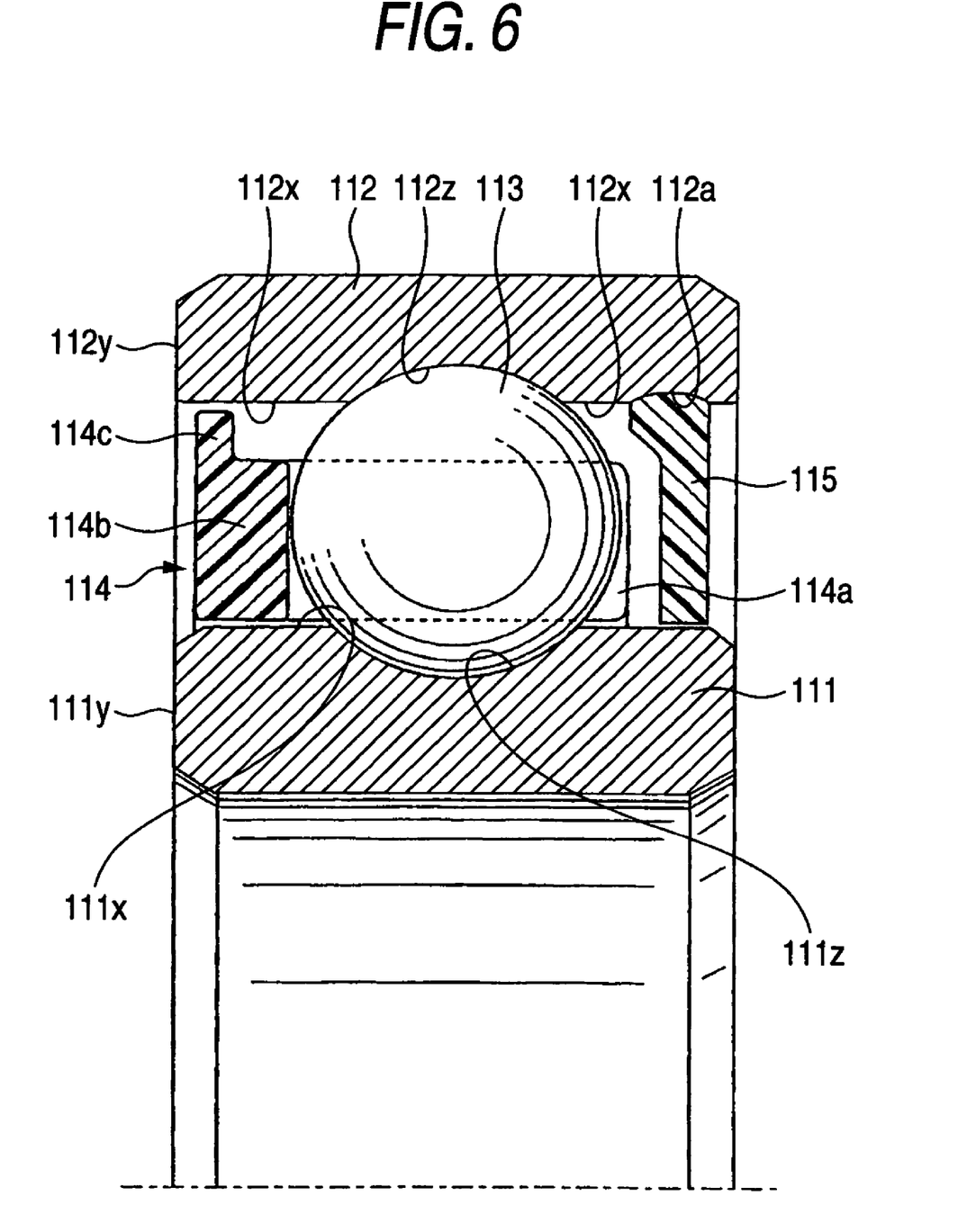
FIG. 6 is a sectional view showing a structure of a ceramic rolling bearing according to a third embodiment of the invention.

FIG. 6 is a sectional view showing a structure of a rolling bearing according to a third embodiment of the invention. A basic constitution of the rolling bearing according to the third embodiment is similar to that shown in the second embodiment and comprises an inner ring 111, an outer ring 112, a plurality of balls 113, a crown type cage 114 and a seal member 115 in a circular ring shape. An outer peripheral face 111x of the inner ring 111 is formed with an inner ring side track groove 111z and an inner peripheral face 112x of the outer ring 102 is formed with an outer ring side track groove 112z. The balls 113 are arranged on a ball track formed by the track grooves and rollably held by pocket portions 114a of the crown type cage 114 at predetermined intervals in a peripheral direction.

The respective members constituting the ball bearing are constituted by a material in consideration of corrosion resistance similar to that of the second embodiment. The inner ring 111, the outer ring 112 and the ball 113 are made of a ceramics, the crown type cage 114 and the seal member 115 are made of a resin having corrosion resistance and a grease (not illustrated) filled in a ring-like space is pertinently selected in accordance with an environment used.

A point of the rolling bearing according to the embodiment which differs from the second embodiment resides in that a seal member on a side of an opening on one side of the ring-like space is omitted for shortening a dimension in an axial direction of the bearing and reducing a number of parts. However, the opening on the side of omitting the seal member needs to hermetically seal in order to prevent the grease filled at inside thereof from being leaked. Hence, according to the rolling bearing of the embodiment, whereas the opening on the side of the pocket portion 114a of the crown type cage 114 is hermetically sealed by the seal member 115 similar to that in the second embodiment, a projected portion 114c projected in a diameter direction is provided at a cylindrical columnar portion 114b of the crown type cage 114 in order to hermetically seal an opening on an opposed side.

Although normally, a clearance between the crown type cage 114 and a cage guide face (inner ring outer peripheral face 111x according to the embodiment) is designed to be small, a clearance between the crown type cage 114 and the outer ring inner peripheral face 112x on an opposed side is designed to be comparatively large. According to the crown type cage 114 of the embodiment, by providing the columnar portion 114b with the projected portion extended to a vicinity of the outer ring inner peripheral face 112x, the grease can be prevented from being leaked from the opening on the side of the columnar portion 114b.

With the above-described constitution, the rolling bearing can also be constituted by the rolling bearing having long service life maintaining excellent lubrication over a long period of time even under a corrosive environment similar to the second embodiment. Further, in the rolling bearing according to the embodiment, a circular peripheral groove 12a for fixing the seal member 115 can easily be formed (processed) and an increased in cost, a crack due to the circular peripheral groove 12a and the like can be prevented.

Incidentally, although, according to the embodiment, the projected portion 114c is provided only on a side of an outer peripheral face of the columnar portion 114b of the cage, the projected portion(s) may be provided on a side of an inner peripheral face of the columnar portion of the cage or on both of the side of the inner peripheral face and the side of the outer peripheral face.

Further, although an explanation has been given by taking an example of the so-to-speak all ceramic bearing in which the inner and outer rings and the ball are formed by using a ceramics according to the above-described two embodiments, the material of forming the ball or the ring to which no seal groove is provided is not limited to a ceramics but may be a metal material having corrosion resistance or the metal material coated with a ceramics thereon. Further, although a ceramic material forming the inner and the outer rings is not particularly limited, for example, silicon nitride species ceramics, silicon carbide ceramics, alumina species ceramics, zirconia species ceramics or a composite ceramics material of these or the like can preferably be adopted therefore.

Although a resin material forming the cage and the seal member is not particularly limited, fluororesin or the like excellent in corrosion resistance is preferably adopted. A core metal formed by a metal capable of resisting to a corrosive environment can also be used for the seal member, however, it is preferable to constitute a shape of mounting the core metal to an inner face side of the seal member or incorporating the core metal to inside of the seal such that the core metal is not exposed to an outer side surface of the seal member.

As has been explained in details, according to the rolling bearing of the invention, an increase in working cost caused by forming the seal mounting groove and generation of a crack or the like can be restrained and excellent lubrication can be maintained over a long period of time even under a corrosive environment.

What is claimed is:

1. A rolling bearing comprising:
   outer and inner rings, at least one comprised of ceramic;
   a plurality of rolling elements interposed between the outer and inner rings;
   a seal groove having a sectional shape in an axial direction of said roller bearing of substantially a partial circular arc, and being formed on a shoulder portion of a raceway of one of the outer and inner rings; and
   a resin seal member including a peripheral edge portion fitted to the seal groove, said resin seal member comprising fluororesin, said resin seal comprising a linear tapered inclined face portion extending from an end of a circular arc of said peripheral edge portion in an inward direction toward an inner peripheral edge of said resin seal member,
   wherein the plurality of rolling elements include balls, the raceways of one of the inner and outer rings being formed in a groove shape and having a maximum depth, and the seal groove having a maximum depth, wherein the maximum depth of the seal groove is smaller than the maximum depth of the raceways, and
   wherein a width of the seal groove in the axial direction is equal to or smaller than ¼ of a total length dimension in the axial direction of the one of the inner and outer rings, and a radius of curvature of the seal groove is a value obtained by multiplying a depth of the seal groove by a multiplication factor of 5 to 30.

2. The rolling bearing according to claim 1, wherein the outer and inner rings are comprised of ceramic.

3. The rolling bearing according to claim 1, wherein a maximum depth of the seal groove is one of equal to and smaller than 0.2 mm.

4. The rolling bearing according to claim 1, wherein a maximum depth of the seal groove is one of equal to and smaller than 0.1 mm.

5. The rolling bearing according to claim 1, wherein the resin seal member includes a fitting portion fitted to the seal groove and a barrel portion opposed to the shoulder portion of the raceway of the other of the one of the inner and outer rings, a width of the fitting portion in the axial direction being one of equal to and larger than 1.2 times of a width of the barrel portion in the axial direction.

6. The rolling bearing according to claim 1, wherein said linear tapered inclined face portion extends from said end of the circular arc of said peripheral edge portion to a plate that extends from said inner peripheral edge of said resin seal member.

7. The rolling bearing according to claim 1, wherein said linear tapered inclined face portion extends a portion of a distance from said end of the circular arc of said peripheral edge portion to said inner peripheral edge of said resin seal member.

8. The rolling bearing according to claim 1, wherein said linear tapered inclined face portion is located on an inside portion of said resin seal member.

9. The rolling bearing according to claim 1, wherein said linear tapered inclined face portion narrows a width of said resin seal member in an axial direction at said inner peripheral edge to less than one half of said width of said resin seal member at said peripheral edge portion.

10. A rolling bearing comprising:
    outer and inner rings, at least one comprised of ceramic;
    a plurality of rolling elements interposed between the outer and inner rings;
    a seal groove having a sectional shape in an axial direction of said roller bearing of substantially a partial circular arc, and being formed on a shoulder portion of a raceway of one of the outer and inner rings; and
    a resin seal member including a peripheral edge portion fitted to the seal groove, said resin seal member comprising fluororesin, said resin seal comprising a linear tapered inclined face portion extending from an end of a circular arc of said peripheral edge portion in an inward direction toward an inner peripheral edge of said resin seal member,
    wherein the plurality of rolling elements include balls, the raceways of one of the inner and outer rings being formed in a groove shape and having a maximum depth, and the seal groove having a maximum depth, wherein the maximum depth of the seal groove is smaller than the maximum depth of the raceways and less than a radius of the partial circular arc of the seal groove, and
    wherein a width of the seal groove in the axial direction is equal to or smaller than ¼ of a total length dimension in the axial direction of the one of the inner and outer rings, and a radius of curvature of the seal groove is a value obtained by multiplying a depth of the seal groove by a multiplication factor of 5 to 30.

11. The rolling bearing according to claim 10, wherein the outer and inner rings are comprised of ceramic.

12. The rolling bearing according to claim 10, wherein a maximum depth of the seal groove is one of equal to and smaller than 0.2 mm.

13. The rolling bearing according to claim 10, wherein a maximum depth of the seal groove is one of equal to and smaller than 0.1 mm.

14. The rolling bearing according to claim 10, wherein the resin seal member includes a fitting portion fitted to the seal groove and a barrel portion opposed to the shoulder portion of the raceway of the other of the one of the inner and outer rings, a width of the fitting portion in the axial direction being one of equal to and larger than 1.2 times of a width of the barrel portion in the axial direction.

15. The rolling bearing according to claim 10, wherein said linear tapered inclined face portion extends from said end of the circular arc of said peripheral edge portion to a plate that extends from said inner peripheral edge of said resin seal member.

16. The rolling bearing according to claim 10, wherein said linear tapered inclined face portion extends a portion of a distance from said end of the circular arc of said peripheral edge portion to said inner peripheral edge of said resin seal member.

17. The rolling bearing according to claim 10, wherein said linear tapered inclined face portion is located on an inside portion of resin seal member.

* * * * *